(12) United States Patent
Gaberthüel et al.

(10) Patent No.: US 11,054,293 B2
(45) Date of Patent: Jul. 6, 2021

(54) METHOD FOR PRODUCING A SENSING ELEMENT FOR A THERMAL FLOW METER, SENSING ELEMENT AND FLOW METER

(71) Applicant: Endress+Hauser Flowtec AG, Reinach (CH)

(72) Inventors: Stephan Gaberthüel, Oberwil (CH); Alexander Grün, Lörrach (DE); Hanno Schultheis, Hermrigen (CH); Tobias Baur, Reinach (CH); Martin Barth, Riehen (CH); Anastasios Badarlis, Birsfelden (CH); Lars Neyerlin, Wahlen (CH); Martin Arnold, Reinach (CH); Oliver Popp, Oberwil (CH)

(73) Assignee: Endress+Hauser Flowtec AG, Reinach (CH)

( * ) Notice: Subject to any disclaimer, the term of this patent is extended or adjusted under 35 U.S.C. 154(b) by 0 days.

(21) Appl. No.: 16/347,528

(22) PCT Filed: Oct. 10, 2017

(86) PCT No.: PCT/EP2017/075788
§ 371 (c)(1),
(2) Date: May 3, 2019

(87) PCT Pub. No.: WO2018/082873
PCT Pub. Date: May 11, 2018

(65) Prior Publication Data
US 2020/0191629 A1 Jun. 18, 2020

(30) Foreign Application Priority Data
Nov. 4, 2016 (DE) .................... 10 2016 121 110.9

(51) Int. Cl.
*H05B 3/00* (2006.01)
*G01F 1/688* (2006.01)
*G01F 15/02* (2006.01)

(52) U.S. Cl.
CPC .......... *G01F 1/6888* (2013.01); *G01F 15/028* (2013.01); *Y10T 29/49083* (2015.01)

(58) Field of Classification Search
CPC ................ C01B 2202/24; G01Q 70/16; Y10T 29/49005; Y10T 29/49826;
(Continued)

(56) References Cited

U.S. PATENT DOCUMENTS 5,271,138 A 12/1993 Frias et al.
5,880,365 A 3/1999 Olin et al.
(Continued)

FOREIGN PATENT DOCUMENTS

DE 10216532 A1 10/2003
DE 102008015359 A1 9/2009
(Continued)

OTHER PUBLICATIONS

Search Report for German Patent Application No. 10 2016 121 110.9, German Patent Office, dated May 24, 2017, 6 pp.
(Continued)

*Primary Examiner* — Thiem D Phan
(74) *Attorney, Agent, or Firm* — Christopher R. Powers; Endress+Hauser (USA) Holding Inc.

(57) ABSTRACT

The present disclosure relates to a method for producing a probe of a thermal flow meter for measuring the mass flow rate of a medium in a measuring tube, the method having the following steps: introducing a probe core in the form of a material to be melted into a first probe casing, the first probe casing having an open first end and a closed second end facing away from the first end; melting the probe core; quenching the probe core to a temperature below the solidification temperature; attaching a thermoelement to a contact surface of the solidified probe core. The invention also relates to a probe obtained according to the production
(Continued)

method and to a flow meter including the probes according to the present disclosure.

7 Claims, 5 Drawing Sheets

(58) Field of Classification Search
CPC ......... Y10T 29/49162; Y10T 29/49174; Y10T 29/49083; G01K 13/02; G01K 7/04; G01R 3/00; G01F 1/6888
USPC .......... 29/611, 428, 595, 850, 857, 858, 868
See application file for complete search history.

(56) References Cited

U.S. PATENT DOCUMENTS

| | | | |
|---|---|---|---|
| 6,971,274 B2 | 12/2005 | Olin | |
| 7,748,267 B2 * | 7/2010 | Olin | ........................ G01F 1/692 73/204.22 |
| 8,935,843 B2 * | 1/2015 | Boguhn | .................. G01F 1/684 29/521 |
| 2005/0223828 A1 | 10/2005 | Olin | |
| 2009/0260431 A1 | 10/2009 | Olin et al. | |
| 2011/0005311 A1 | 1/2011 | Boguhn et al. | |
| 2013/0269428 A1 | 10/2013 | Baur et al. | |

FOREIGN PATENT DOCUMENTS

| | | |
|---|---|---|
| DE | 102009028850 A1 | 3/2011 |
| DE | 102010031127 A1 | 1/2012 |
| DE | 102011089597 A1 | 6/2013 |

OTHER PUBLICATIONS

Search Report for International Patent Application No. PCT/EP2017/075788, WIPO, dated Feb. 13, 2018, 11 pp.

* cited by examiner

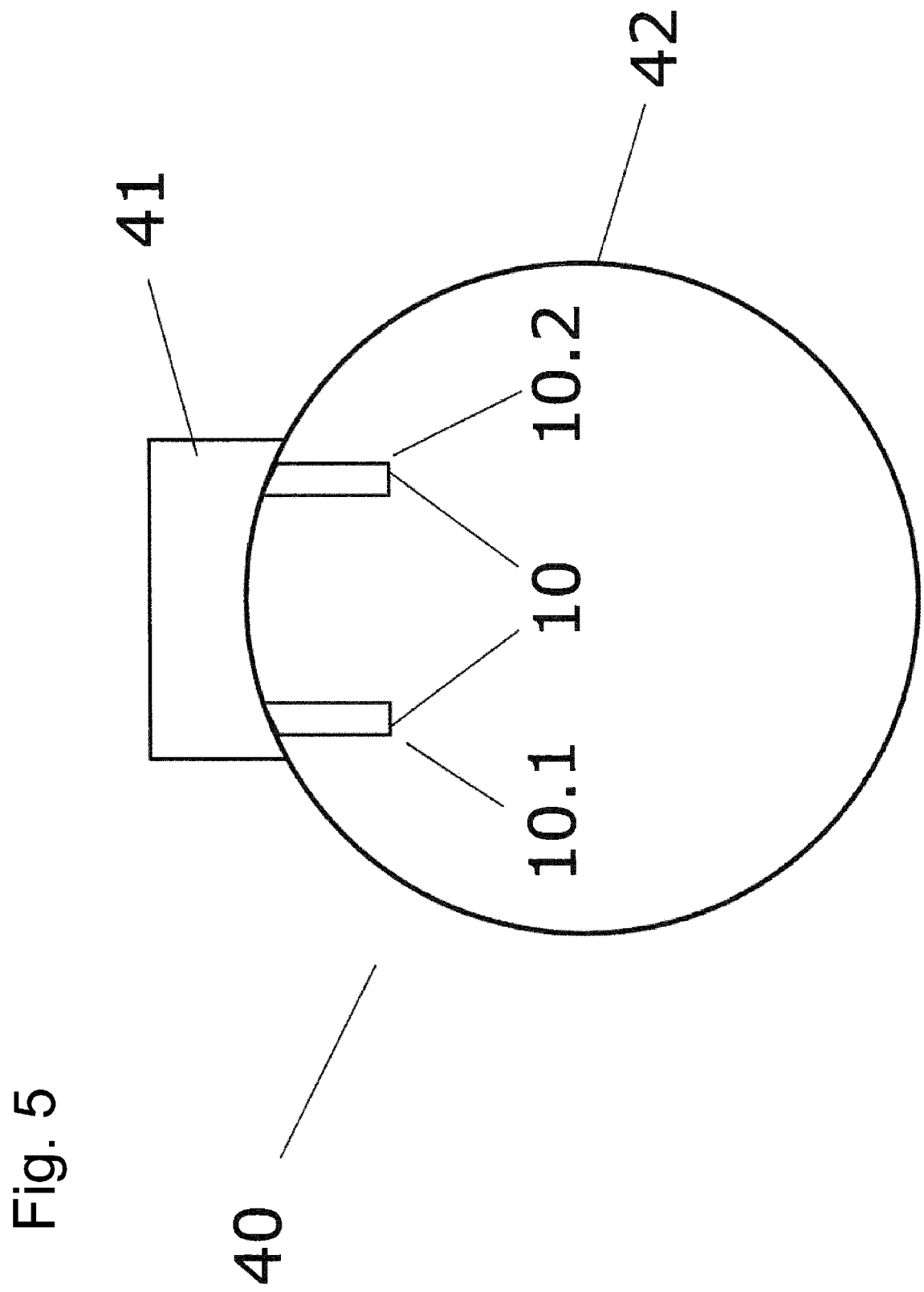

METHOD FOR PRODUCING A SENSING ELEMENT FOR A THERMAL FLOW METER, SENSING ELEMENT AND FLOW METER

CROSS-REFERENCE TO RELATED APPLICATIONS

The present application is related to and claims the priority benefit of German Patent Application No. 10 2016 121 110.9, filed on Nov. 4, 2016 and International Patent Application No. PCT/EP2017/075788 filed on Oct. 10, 2017, the entire contents of which are incorporated herein by reference.

TECHNICAL FIELD

The invention relates to a method for producing a probe of a thermal flow meter for measuring the mass flow rate of a medium in a measuring tube, a probe, and a flow meter.

BACKGROUND

Thermal flow meters have been the prior art for a long time; one or more probes are introduced into a medium flowing through a measuring tube, wherein the probes are configured to measure the temperature of the medium or to heat the medium. For example, the temperature-measuring probe may be located downstream of the heating probe such that the temperature-measuring probe is heated via the medium that is heated by the heating probe.

Important for a high measurement accuracy of a thermal flow meter and for a low measuring accuracy fluctuation between different flow meters of an identical type is a constant build quality of the probes used. Important for a high sensitivity of the probes relating to high mass flow rate of the medium is a low heat transfer resistance between a contact surface of the probe with the medium and a heating or temperature-measuring thermoelement.

The prior art, e.g., DE102008015359A1, shows a probe with a probe casing, the probe casing having a thermoelement embedded in a filler material.

What is disadvantageous with such a solution is that, with respect to the heat transfer between probe and a medium surrounding the probe, a filler material, on the one hand, causes fluctuations between different probes of a series and, on the other, is prone to aging the probe, so that, with increasing service life, such a probe must be recalibrated to avoid measuring errors.

SUMMARY

The aim of the invention is therefore to propose a probe which has improved stability with regard to its production and with regard to its long-term behavior.

This aim is achieved by a method for producing a probe of a thermal flow meter, by a probe for a thermal flow meter, and by a thermal flow meter according to the present disclosure.

The method according to the invention for producing a probe of a thermal flow meter for measuring the mass flow rate of a medium in a measuring tube has the following steps:
introducing a probe core in the form of a material to be melted into a first probe casing, wherein the first probe casing has an open first end and a closed second end facing away from the first end;
melting the probe core;
quenching the probe core to a temperature less than the solidification temperature;
attaching a thermoelement to a contact surface of the solidified probe core.

A connection layer in which the probe core is firmly connected to the probe casing, which connection layer ensures good heat transfer and long-term stability with regard to the thermal properties of the probe, is produced at a probe-core-to-probe-casing contact surface by melting and afterwards quenching of the probe core.

In one embodiment of the method, the contact area is prepared by machining for the attachment of the thermoelement.

In one embodiment of the method, after quenching of the probe core, the probe core is exposed in a first region by partial removal of a wall of the first probe casing.

In one embodiment of the method, after exposure, a second probe casing with an open third and an open fourth end is joined, in particular welded, by means of the third open end, to the first end in a leak-tight manner, wherein the second casing wraps completely around the first region.

In one embodiment of the method, the first region in a subregion is machined, so that the subregion of the probe core is spaced apart from all surfaces of the first or second probe casing, wherein the subregion comprises all first cross-sections of the probe core, which first cross-sections intersect or touch the contact surface.

In one embodiment of the method, the thermoelement is attached to the contact surface of the probe core by means of a solder or sinter layer.

The probe according to the invention of a thermal flow meter for measuring the mass flow rate of a medium in a measuring tube produced by a method according to the invention comprises:
a first probe casing having an open first end and a closed second end;
a probe core, said probe core at least partially filling the first probe casing;
a thermoelement which is thermally coupled to the probe core, wherein the thermoelement is configured to increase or detect the temperature of the probe core;
wherein
producing the probe core comprises melting of a material to be melted in the first probe casing.

In one embodiment of the probe, the probe core has a first longitudinal axis, an outer surface connected to the first probe casing, a center of mass, and a contact surface facing away from the second end of the probe core with respect to the center of mass,
wherein the thermoelement is attached to the contact surface by means of a solder or sinter layer.

In one embodiment of the probe, the probe core comprises a first region which projects from the first probe casing in the axial direction, wherein the first region has the contact surface.

In one embodiment of the probe, the first region is surrounded by a second probe casing with an open third end and an open fourth end, which second probe casing is connected, in particular welded, in a leak-tight manner to the open first end of the first probe casing via the third end, wherein the first region in a subregion is machined, so that the subregion of the probe core is spaced apart from all surfaces of the first or second probe casing, wherein the second region comprises all first cross-sections of the probe core, which first cross-sections intersect or contain the contact surface.

In one embodiment of the probe, the first probe casing and/or the second probe casing are cylindrical.

In one embodiment of the probe, the first probe casing comprises stainless steel, wherein the probe core has a thermal conductivity of more than 100 W/(m·K), wherein the probe core has at least one metal from the following list: copper, silver, aluminum, nickel, indium, gold, tin. The significantly better thermal conductivity of the probe core with respect to the stainless steel, in the case of a probe used as heating element, achieves a homogeneous temperature distribution at a heat transfer surface between the probe and a medium flowing around the probe.

Conversely, in the case of a probe used as a temperature sensor, a rapid temperature adaptation of the probe core to a temperature change of the medium and a homogeneous temperature distribution at the contact surface between probe core and thermoelement are achieved.

The thermal flow meter according to the invention for measuring the mass flow rate of a medium comprises:
a measuring tube having a second longitudinal axis;
at least one probe according to the invention that is embedded into the measuring tube;
an electronic operating circuit configured to operate the at least one probe.

In one embodiment of the probe, the thermal flow meter comprises at least two probes,
wherein the electronic operating circuit is configured to heat at least one first probe,
wherein the electronic operating circuit is configured to determine the temperature of the medium by means of at least one second probe.

BRIEF DESCRIPTION OF THE DRAWING

The invention will now be described with reference to exemplary embodiments.

FIG. 5 shows a schematic front view of a thermal flow meter having two probes according to the invention.

DETAILED DESCRIPTION

Figure 1:
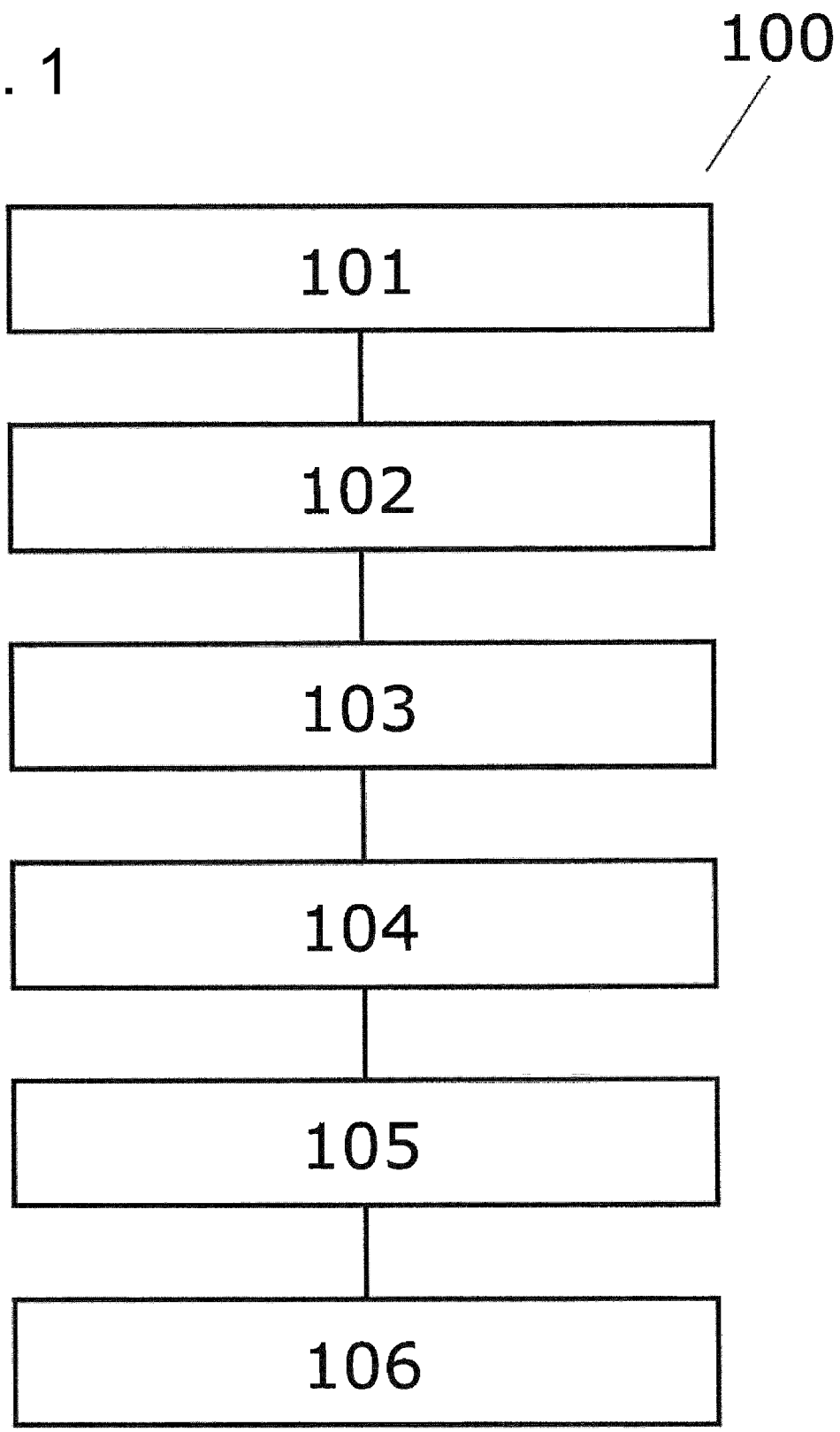
FIG. 1 shows a schematic process for manufacturing a probe according to the invention.

FIG. 1 shows an embodiment of a method sequence 100 for producing a probe 10 according to the invention.

In a first step 101, a probe core 13 in the form of a material to be melted is introduced into a first probe casing 11, wherein the material to be melted has copper or silver, and wherein the first probe casing 11 is made of a stainless steel.

In a second step 102, the probe core 13 is melted so that the liquid material of the probe core 13 collects in the region of a closed second end 22 of the first probe casing 11. While the probe core 13 is fluid, an intermetallic connecting layer is formed at an interface between the probe core 13 and the first probe casing 11, in which layer the material of the probe core 13 and the material of the first probe casing 11 mix.

In a third step 103, the probe core 13 is quenched to a temperature lower than its solidification temperature. Due to the formation of the intermetallic connecting layer, the contact between probe core 13 and first probe casing 11 is maintained after the probe core has solidified.

In a fourth step 104, the probe core 13 is exposed in a first region by partial removal of a wall of the first probe casing 11.

In a fifth step 105, a contact surface 14 is prepared by machining, in particular, smoothed and aligned, for the attachment of a thermoelement 31. This can be accomplished, for example, by drilling or milling.

In a sixth step 106, a thermoelement is attached to the contact surface by means of a solder or sinter layer.

In a seventh step 107, a second probe casing 12 with an open third end 23 and an open fourth end 24 is attached, in particular welded, to the first end 21 in a leak-tight manner by means of the third open end, wherein the second probe casing 12 wraps completely around the first region.

Advantageously, the first region is machined in a subregion, so that the subregion 16 of the probe core is spaced apart from all surfaces of the first probe casing 11 and/or the second probe casing 12, wherein the subregion 16 comprises all first cross-sections of the probe core, which first cross-sections intersect or touch the contact surface 14.

Figure 2:
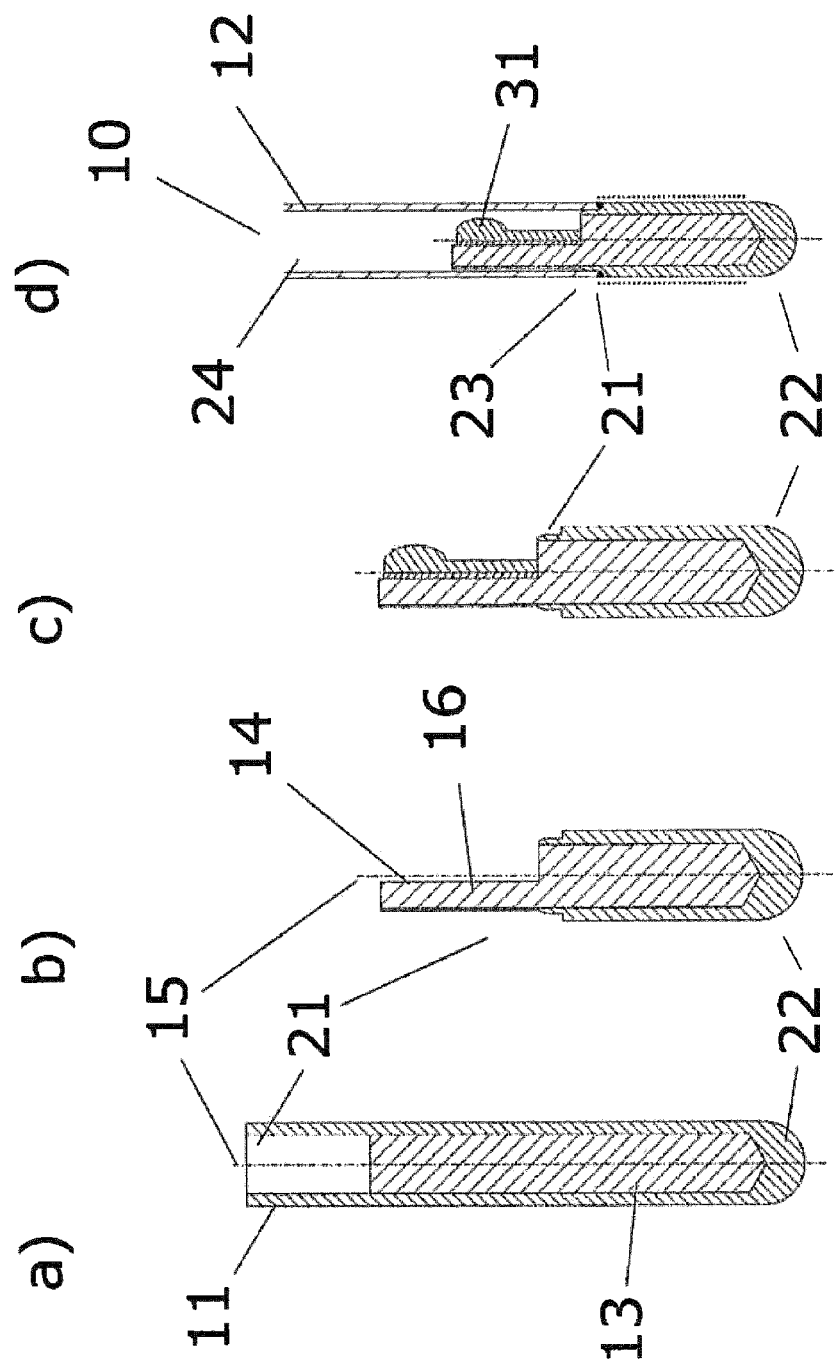
FIGS. 2(*a*)-2(*d*) show steps in the production of a probe according to the invention.

FIG. 2 shows cross-sections of a probe 10 according to the invention at various stages of manufacture.

FIG. 2 *a*) shows a cross-section of the probe 10 at a stage in which the first probe casing 11 has the probe core 13 in a fluid or already solidified state.

FIG. 2 *b*) shows a cross-section of the probe at a stage in which the probe core is exposed in the first region, wherein an exposure of the probe core allows access to the probe core 13 radially with respect to a first longitudinal axis 15.

FIG. 2 *c*) shows a cross-section of the probe at a stage in which, after exposure of the probe core 13 in the region, the thermoelement 31 is attached to the contact surface 14 of the probe core 13.

FIG. 2 *d*) shows a cross-section of a finished probe 10 with the second probe casing 12, which is attached, in particular welded, to the first end 21 of the first probe casing 11 via the third end 23.

Figure 3:
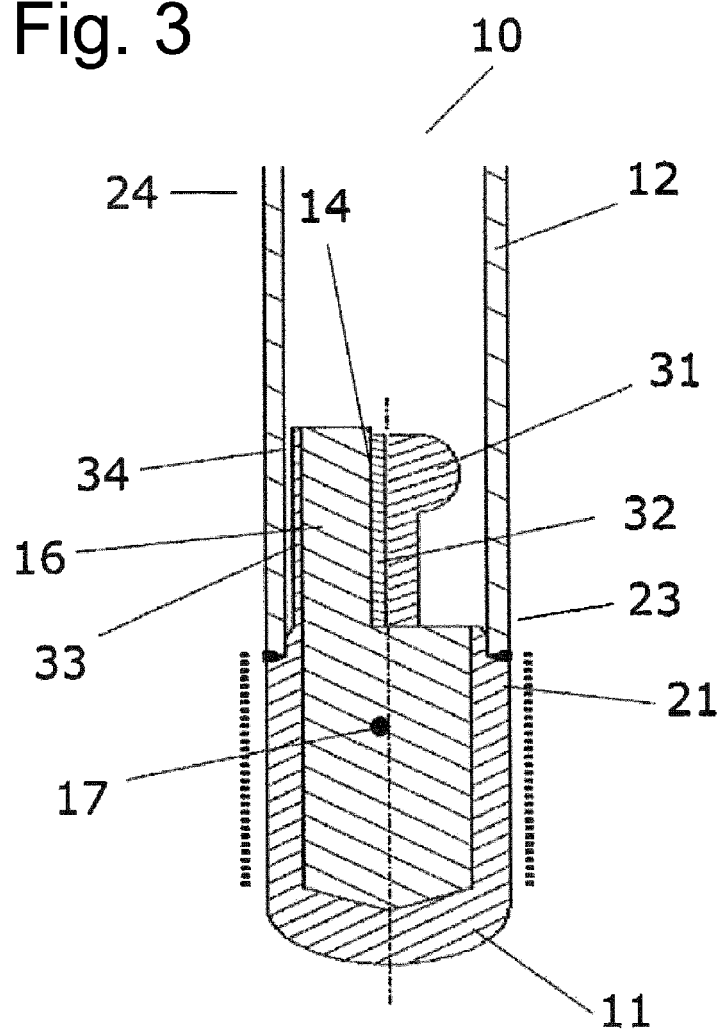
FIG. 3 shows an enlarged and distorted view of the fabrication stage shown in FIG. 2(*d*)

FIG. 3 shows an enlarged view of the cross-section of the finished probe 10 shown in FIG. 2 *d*), wherein the illustration is horizontally distorted in order to make fine details visible. The thermoelement 31 is attached to the contact surface 14 of the probe core 13 via a solder or sinter layer 32. The probe core 13 is supported on a side opposite the contact surface 14 by a support 33, wherein the support 33 is an extension of the first probe casing 11. An embodiment of the probe 10 without the support 33 is also conceivable. The probe core 13 is thereby configured in the subregion 16 such that it is spaced apart from all surfaces of the second probe casing 12. If the probe does not include a support 33, the probe core 13 in the subregion 16 is spaced apart from all surfaces of the first probe casing 11 and the second probe casing 12. The spacing of the probe core from the second probe casing or from the first probe casing and the second probe casing in the subregion ensures a homogeneous distribution of the temperature in the probe core. This ensures a uniform heat transfer to the medium in the dotted region when the probe 10 is used as a heating element. Conversely, when the probe is used as a temperature sensor, uniform exposure of the thermoelement 31 to the temperature of the medium is ensured.

Figure 4:
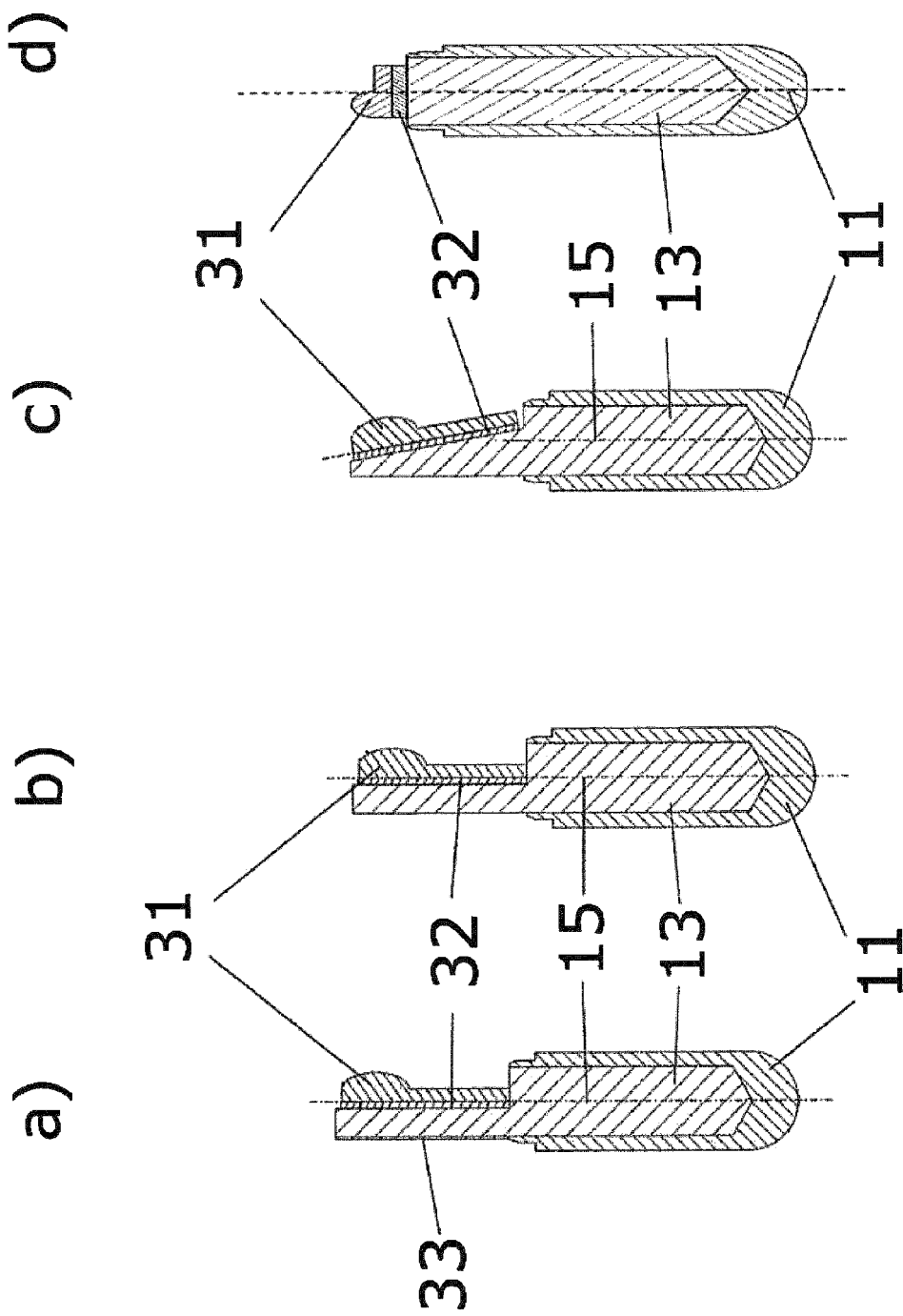
FIGS. 4(*a*)-4(*d*) show embodiments of the probe according to the invention.

FIGS. 4 *a*) through *d*) show schematic cross-sections of several embodiments of the probe according to the invention, wherein, for the sake of clarity, the second probe casing has been excluded. FIG. 4 *a*) shows the embodiment illustrated in FIGS. 2 *a*) through *d*) and in FIG. 3 with support 33. FIG. 4 *b*) shows the embodiment illustrated in FIG. 4 *a*) without a support. FIG. 4 *c*) shows an embodiment with contact surface 14 inclined relative to the first longitudinal axis 15. FIG. 4 *d*) shows an embodiment with contact surface 14 perpendicular to the longitudinal axis 15. The embodiments shown in FIGS. 4 *b*) and *c*) may also have a support according to the embodiment shown in FIG. 4 *a*). The embodiments shown in FIGS. 4 *a*) through *c*) make it possible to produce thin probes for a predetermined thermoelement 31.

FIG. 5 shows a schematic front view of a thermal flow meter 40 according to the invention having a measuring tube 42, two probes 10 according to the invention that are arranged within the lumen of the measuring tube 42, and a housing 41 having an electronic operating circuit, which electronic operating circuit is configured to operate the probes 10.

To measure the mass flow rate of a medium through the measuring tube 40, a probe 10.1 in the medium flowing through the measuring tube 40 is, for example, heated in such a way that a temperature difference in relation to the media temperature remains constant. It is appropriate to use a second probe 10.2 for measuring the temperature of the medium, which second probe is arranged upstream of or, as shown in FIG. 2, adjacent to the heated probe 10.1, in order to maintain the temperature difference. Assuming consistent media properties such as density or composition, it is possible to determine the mass flow rate of the medium via the heating current necessary for maintaining the temperature.

The probes 10 may also be arranged in succession, one after the other, in the flow direction, wherein a first upstream probe heats the medium flowing past and, with it, a second probe situated downstream. In this case, the heating line, required for maintaining a temperature difference, of the first probe depends upon the flow rate of the medium.

The invention claimed is:

1. A method for producing a probe of a thermal flow meter for measuring the mass flow rate of a medium in a measuring tube, the method comprising:

introducing a probe core in the form of a material to be melted into a first probe casing, wherein the first probe casing includes an open first end and a closed second end opposite the first end;

melting the probe core;

cooling the probe core to a temperature lower than a solidification temperature of the material to be melted;

after cooling the probe core, exposing a region of the probe core by removal of at least a portion of a wall of the first probe casing; and attaching a thermoelement to a contact surface of the solidified probe core.

2. The method of claim 1, wherein the contact surface is prepared by machining the solidified probe core to form an area configured for attaching the thermoelement.

3. The method of claim 1, further comprising, after exposing the region, attaching a open third end of a second probe casing to the first end of the first probe casing in a leak-tight manner, wherein the second probe casing further includes an open fourth end opposite the open third end, wherein the second probe casing surrounds the region.

4. The method of claim 3, wherein the region is machined in a subregion such that the subregion of the probe core is separated from all surfaces of the first probe casing and/or the second probe casing, wherein the subregion includes all cross-sections of the probe core that intersect or touch the contact surface.

5. The method of claim 1, wherein the thermoelement is attached to the contact surface of the probe core using a solder or sinter layer.

6. The method of claim 1, wherein cooling the probe core includes quenching the probe core to a temperature lower than the solidification temperature.

7. The method of claim 1, wherein the thermoelement is configured to increase and/or detect a temperature of the probe core.

* * * * *